United States Patent [19]

Dewitz et al.

[11] Patent Number: 4,865,627
[45] Date of Patent: Sep. 12, 1989

[54] METHOD AND APPARATUS FOR SEPARATING FINE PARTICULATES FROM A MIXTURE OF FINE PARTICULATES AND GAS

[75] Inventors: Thomas S. Dewitz, Houston; Louis H. Turner, III, The Woodlands; Johannes E. G. Ploeg, Houston, all of Tex.; Matheus M. Van Kessel, London; Andrew M. Scott, Ince Nr. Chester, both of United Kingdom; Rudi Everts, The Hague, Netherlands

[73] Assignee: Shell Oil Company, Houston, Tex.

[21] Appl. No.: 115,933

[22] Filed: Oct. 30, 1987

[51] Int. Cl.$^4$ ............................................. B01D 46/04
[52] U.S. Cl. ................................. 55/20; 55/21; 55/96; 55/97; 55/270; 55/283; 55/302; 55/337
[58] Field of Search ................. 55/20, 21, 96, 97, 270, 55/283, 302, 324, 327, 334, 337

[56] References Cited

U.S. PATENT DOCUMENTS

| | | | |
|---|---|---|---|
| 2,731,107 | 1/1956 | Hersey, Jr. | 55/283 |
| 3,073,097 | 1/1963 | Hallett et al. | 55/283 |
| 3,256,679 | 6/1966 | Snyder | 55/293 |
| 3,577,705 | 5/1971 | Sharlit | 55/283 X |
| 3,653,188 | 4/1972 | Fisher et al. | 55/302 X |
| 3,695,007 | 10/1972 | Farnworth | 55/302 X |
| 3,841,065 | 10/1974 | Espeel | 55/302 X |
| 3,944,404 | 3/1976 | Andrasfalry | 55/302 X |
| 4,062,664 | 12/1977 | Dupre et al. | 55/334 X |
| 4,220,457 | 9/1980 | Fredriksen | 55/273 |
| 4,227,903 | 10/1980 | Gustavsson et al. | 55/302 |
| 4,264,345 | 4/1981 | Miller | 55/302 X |
| 4,299,597 | 11/1981 | Oetiker et al. | 55/302 X |
| 4,344,781 | 8/1982 | Higgins et al. | 55/302 X |
| 4,398,931 | 8/1983 | Shevlin | 55/302 X |
| 4,521,231 | 6/1985 | Shilling | 55/302 |
| 4,544,389 | 10/1985 | Howeth | 55/302 |
| 4,604,112 | 8/1986 | Ciliberti et al. | 55/302 X |
| 4,637,473 | 1/1987 | Gillis et al. | 55/302 X |
| 4,639,260 | 1/1987 | Borow | 55/324 X |
| 4,735,635 | 4/1988 | Israelson et al. | 55/97 X |

FOREIGN PATENT DOCUMENTS

| | | | |
|---|---|---|---|
| 2834781 | 2/1980 | Fed. Rep. of Germany | 55/283 |
| 1159598 | 6/1985 | U.S.S.R. | 55/283 |

*Primary Examiner*—Robert Spitzer

[57] ABSTRACT

A method and apparatus for removal of fine particulate fly ash at high temperature and pressures using a bag filter which produces a clean gas stream that is recycled to compressors or power recovery turbines and a concentrated syngas stream blowdown from which additional solids are subsequently removed.

10 Claims, 3 Drawing Sheets

METHOD AND APPARATUS FOR SEPARATING FINE PARTICULATES FROM A MIXTURE OF FINE PARTICULATES AND GAS

BACKGROUND OF THE INVENTION

Conventional filtering systems, such as bag filters, are directed to filtering dust, dirt, or other solid particles from air or other gaseous media.

However, removing fine particulate solids, such as fly ash from a gasifier, at high temperatures and pressures produces a gas stream that is sufficiently clean so as to be recycled to compressors or power recovery turbines.

Conventional filters in high temperature fly ash service experience high pressure drops across the filters; poor reliability since the filters tend to fail, collapse, and/or tear; and persistent reentrainment of the finely divided fly ash in the filter vessel. Also, the fly ash that is collected on the filter is difficult to remove from the vessel due to the cohesiveness properties of the finely divided fly ash.

The present invention is directed to overcoming these problems in the prior art.

Applicants are not aware of any prior art which, in their judgment as persons skilled in this particular art, would anticipate or render obvious the present invention. However, for the purpose of fully developing the background of the invention, and establishing the state of requisite art, the following art is set forth: U.S. Pat. Nos. 4,227,903; 3,256,679; 4,264,345; 4,220,457; 4,521,231; 4,344,781 and 4,398,931.

SUMMARY OF THE INVENTION

The primary purpose of the present invention relates to separating fine particulates from a mixture of particulates and gas under elevated temperature and pressure conditions. In particular, this invention relates to separating flyash from synthesis gas (also known as syngas) produced by a coal gasification reactor, hereinafter referred to as a gasifier.

Preferably, such an apparatus includes: means for introducing the mixture of particulates and gas into a container; means for passing the mixture through filtering means located within the container thereby separating the particulates from the gases into two flowing streams, a first stream being mostly particulates and a second stream being mostly gas; means for splitting the flow of the first and second streams to achieve a desired ratio of flow rates of the first and second streams; and means for discharging the first and second streams separately from the container.

Preferably, a method for accomplishing this separation includes: introducing the mixture of particulates and gas into a container; passing the mixture through filtering means located within the container thereby separating the particulates from the gases into two flowing streams, a first stream being mostly particulates and a second stream being mostly gas; splitting the flow of the first and second streams to achieve a desired ratio of flow rates of said first and second streams; and discharging the first and second streams separately from the container.

The various features of novelty which characterize the invention are pointed out with particularity in the claims forming a part of this disclosure. For a better understanding of this invention, its operating advantages and specific objects obtained by its uses, reference may be made to the accompanying drawings and descriptive matter in which there are illustrated preferred embodiments of the invention.

DESCRIPTION OF A PREFERRED EMBODIMENT

Figure 1:
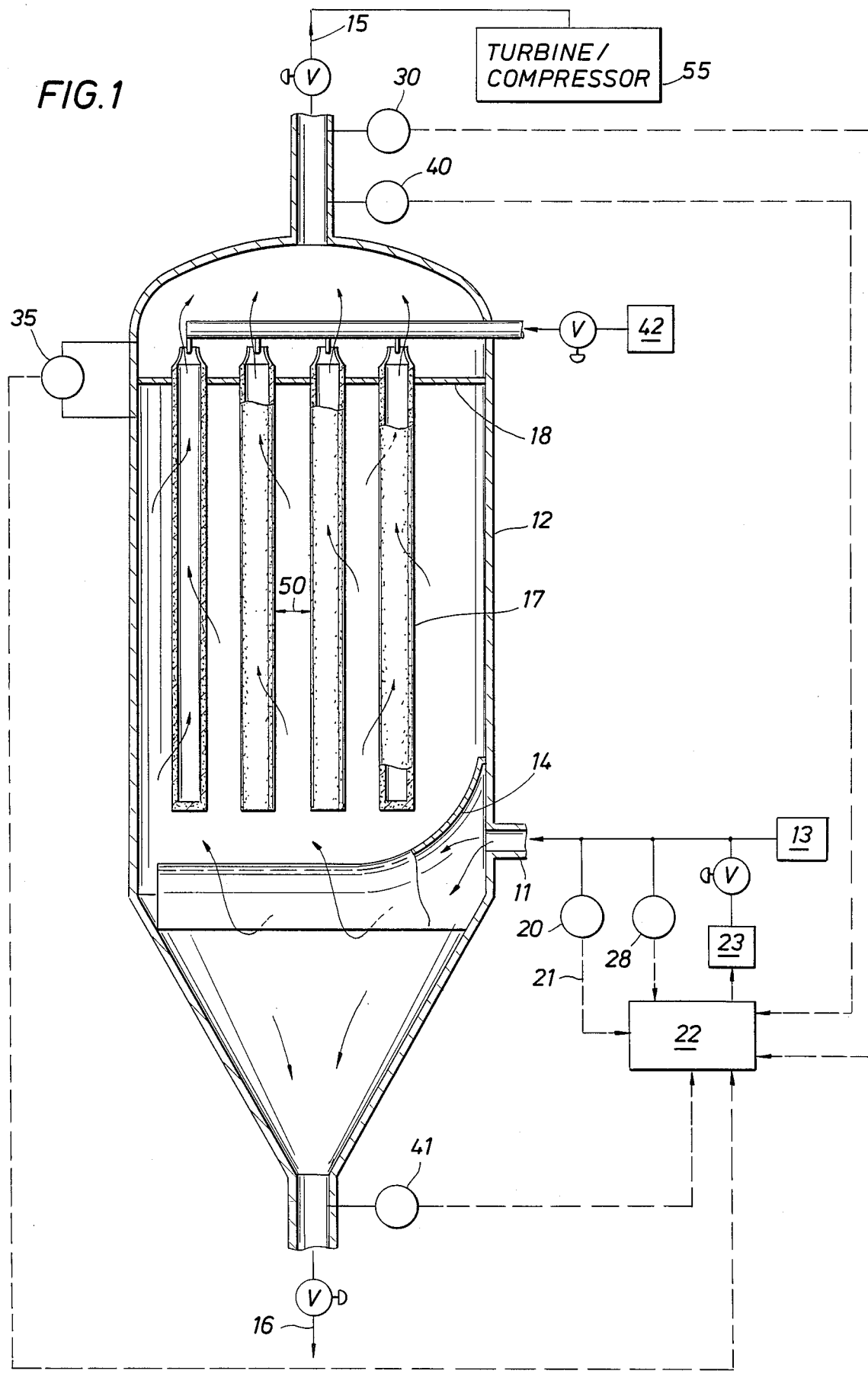
FIG. 1 illustrates a preferred embodiment of the invention.

Generation of synthesis gas occurs by partially combusting carbonaceous fuel, such as coal, at relatively high temperatures in the range of 800°-2000° C. and at a pressure range of from about 1-200 bar in the presence of oxygen or oxygen-containing gases in a gasifier. Oxygen-containing gases include air, oxygen enriched air, and oxygen optionally diluted with steam, carbon dioxide and/or nitrogen.

In the present invention, the fuel and gas mixture is discharged from a feed vessel apparatus, preferably having multiple outlets, each outlet being in communication with at least one burner associated with the gasifier. Typically, a gasifier will have burners in diametrically opposed positions. Generally, the burners have their discharge ends positioned to introduce the resulting flame and the agent of combustion into the gasifier.

Gasification of coal produces a gas, known as synthesis gas, that contains mostly carbon monoxide and hydrogen. Also produced are varying quantities of other gases, such as carbon dioxide and methane, and various liquid and solid materials, such as small particles of ash and carbon commonly known and collectively defined herein as flyash or flyslag. This flyash, because it is derived from a "reducing" atmosphere, tends to be different in composition and properties from flyash normally associated with combustion boilers where a fully oxidizing atmosphere is utilized. For example, the flyash from a process for partially combusting coal may contain elemental iron, sulfides, and deposited carbon, components not normally associated with boiler flyash.

The present invention particularly relates to removing fine particulate fly ash solids from synthesis gas under high temperatures and pressures to produce a gas stream that is sufficiently clean to be recycled to compressors or power recovery turbines and a concentrated syngas stream blowdown. A mechanism for accomplishing this separation is the capability of changing the velocity of a gas stream flowing upward through the filters so as to offset the usual net upward flow of gas which entrains particulates and therefore reduces filtration efficiency.

Furthermore, the present invention is capable of splitting the flow of inlet gas containing particulates to be removed so that only the volume of gas needed to be cleaned and recycled is filtered so as to extend the life of the filters prior to cleaning and/or replacement.

An advantage of the present invention is the capability to remove fine particulate solids from a gaseous stream so that it is sufficiently clean to be recycled to compressors or power recovery turbines.

A further advantage of the present invention is the capability of offsetting the usual upward flow of gas which reentrains particulates and therefore increases the filtration efficiency.

Another advantage of the present invention is the capability of splitting flow of inlet gas so as to filter only the volume of gas required for the compressors or turbines and thereby increasing the time between filter replacements/shutdowns.

Although the invention is described hereinafter primarily with reference to pulverized coal and a gasifier, the method and apparatus according to the invention are also suitable for catalysts and other finely divided reactive solids which could be partially combusted, such as lignite, anthracite, bituminous, brown coal, soot, petroleum coke, and the like. Preferably, the size of solid carboneous fuel is such that 90 percent by weight of the fuel has a particle size smaller than No. 6 mesh (A.S.T.M).

Having thus generally described the apparatus and mehtod of the present invention, as well as its numerous advantages over the art, the following is a more detailed description thereof, given in accordance with specific reference to the drawings. However, the drawings are of process flow type in which auxiliary equipment, such as pumps, compressors, cleaning devices, etc. are not shown. All values are merely exemplary or calculated.

Figure 3:
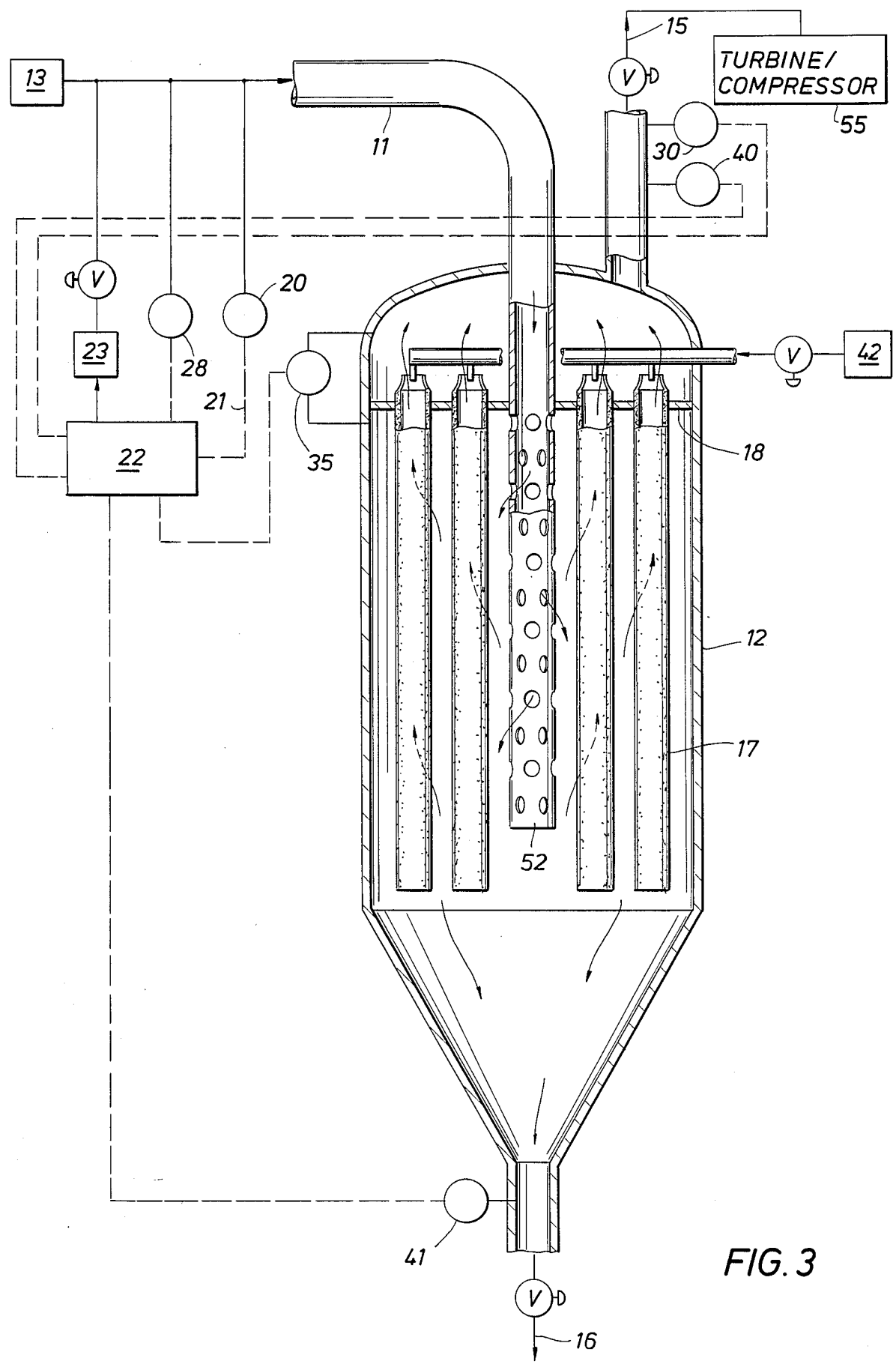
FIG. 3 illustrates an additional preferred embodiment of the invention.

Referring to FIG. 1 of the drawings, an apparatus and method for separating fine particulates, such as flyash from partially combusted pulverized coal, from a mixture of particulates and gas under elevated temperature and pressure conditions generally includes means for introducing the mixture, such as inlet 11, into a container 12 in a direction tangential with respect to the container 12. Alternatively, the mixture can be injected in a radial direction with respect to the container 12 as shown in FIG. 3.

Introducing the mixture in a direction tangential to the container 12 provides gross separation of particulates from the gas by saltation should transient high loadings of particles to the vessel occur due to process upsets. However, introducing the mixture in a radial direction with respect to the container 12 may be preferred in the case where the particulate concentration is low and good distribution of the particulates over the surfaces of the filters is necessary.

Means for passing the mixture through filtering means located within the container 12 thereby separating the particulates from the gases into two flowing streams, a first stream 16 being mostly particulates having a concentration of, say, 1000 grains/actual cubic foot, and a second stream 15 being mostly gas having a particulate concentration of, say, 1 grain/actual cubic foot includes injecting the mixture to be filtered from a pressurized source 13 which in this case is a coal gasification reactor. Since the mixture contains very fine particulates and is introduced into the container 12 at elevated temperatures and pressures, the pressure drop through the filter rises rapidly due to adhesion of the particulates to the filter thus making the filter difficult to clean. The provision for a net downward velocity diminishes the effects of pressure and flow upsets with respect to the filter by reducing the reentrainment of particulates in the vessel.

Filtering means, shown for illustrative purposes as cylindrically-shaped bag filter devices 17 hung from a mount 18, may be made of fabric or porous, monolithic (ceramic, metal, or plastic) material. The spacing 50, say 1-6 inches, between the bag filters is a function of the particulate concentration of the mixture being introduced.

Means for splitting the flow of the first and second streams to achieve a desired ratio of flow rates of the first and second streams, say 2:1-1:10 is accomplished by throttling at least one stream, preferably the second stream 15, in order to achieve a select pressure, temperature, or flow rate in one or both streams.

Preferably, the average velocity of the gas in the container 12 flowing towards a lower portion thereof is maintained by selectively positioning the inlet 11 for introducing the mixture as well as by adjusting the flow split of the stream 15 and 16 as described above. This is important to separating the particulates from the gas because fine particulates are reentrained more persistently at high temperatures due to the increase in gas viscosity.

The mixture injected into the container 12 is deflected downward, i.e. toward the lower portion of the container 12, and then deflected upward toward the upper portion of the container 12 using a flow baffle 14 or in any other manner well known to the art. Initial deflection toward the lower portion of the container 12 and then towards the upper portion of the container 12 prevents short-circuiting of the mixture when injected into the container 12 and provides greater ensurability that the mixture will travel upward from the filtering device.

The temperature of the mixture is determined using means such as a temperature transducer 20. A signal, represented for ease of illustration as dashed line 21, is transmitted to a processor-controller 22. The determined temperature of the mixture is compared with a preselected temperature using the processor-controller 22 and the temperature of the mixture is adjusted, say by injecting a gas having a selected temperature from source 23 into the mixture.

Alternatively, the temperature of the mixture could be adjusted by a heat exchanger upstream of the filter and downstream of the source 13.

The temperature of the mixture is typically 250° C. The purpose of controlling the temperature of the mixture is to prevent damage to the filter fabric material. Should the temperature of the mixture exceed the preselected temperature, then the filter fabric could be damaged.

The particulate concentration of stream 15 is determined, say by isokinetic sampling or opacity using device 30. The determined particulate concentration of stream 15 is compared with a preselected concentration using controller 22 and the concentration of stream 15 is adjusted, say by adjusting the ratio of the flow rates of the first and second streams 16 and 15, respectively, and the incoming mixture from source 13 using gas flow rate meters 41, 40, and 28 in communciation with the processor controller 22.

The particulate concentration of stream 15 is typically 1 grain/actual cubic foot. The purpose of controlling the particulate concentration of the mixture is to reduce fouling and erosion in the equipment downstream of the filter, such as a turbine or compressor 55.

Clogging of the filters 17 is determined by measuring the differential pressure across the filters 17, say by using a differential pressure transducer 35. The determined differential pressure is compared with a preselected differential pressure using controller 22 to determine the need for cleaning the filters 17, i.e. dislodging particulates therefrom. Typically, when the differential pressure reaches 0.5 psig, then injection of the mixture from source 13 to the container 12 is ceased and pressurized gas from source 42, such as syngas, is injected into the container 12 at a flow rate and pressure higher than that of the mixture introduced into the container 12 thereby cleaning the filters. After a certain period of time, the cleaning operation is ceased, solids are removed from the container 12, and injection of the mixture from source 13 into the container 12 is resumed.

Figure 2:
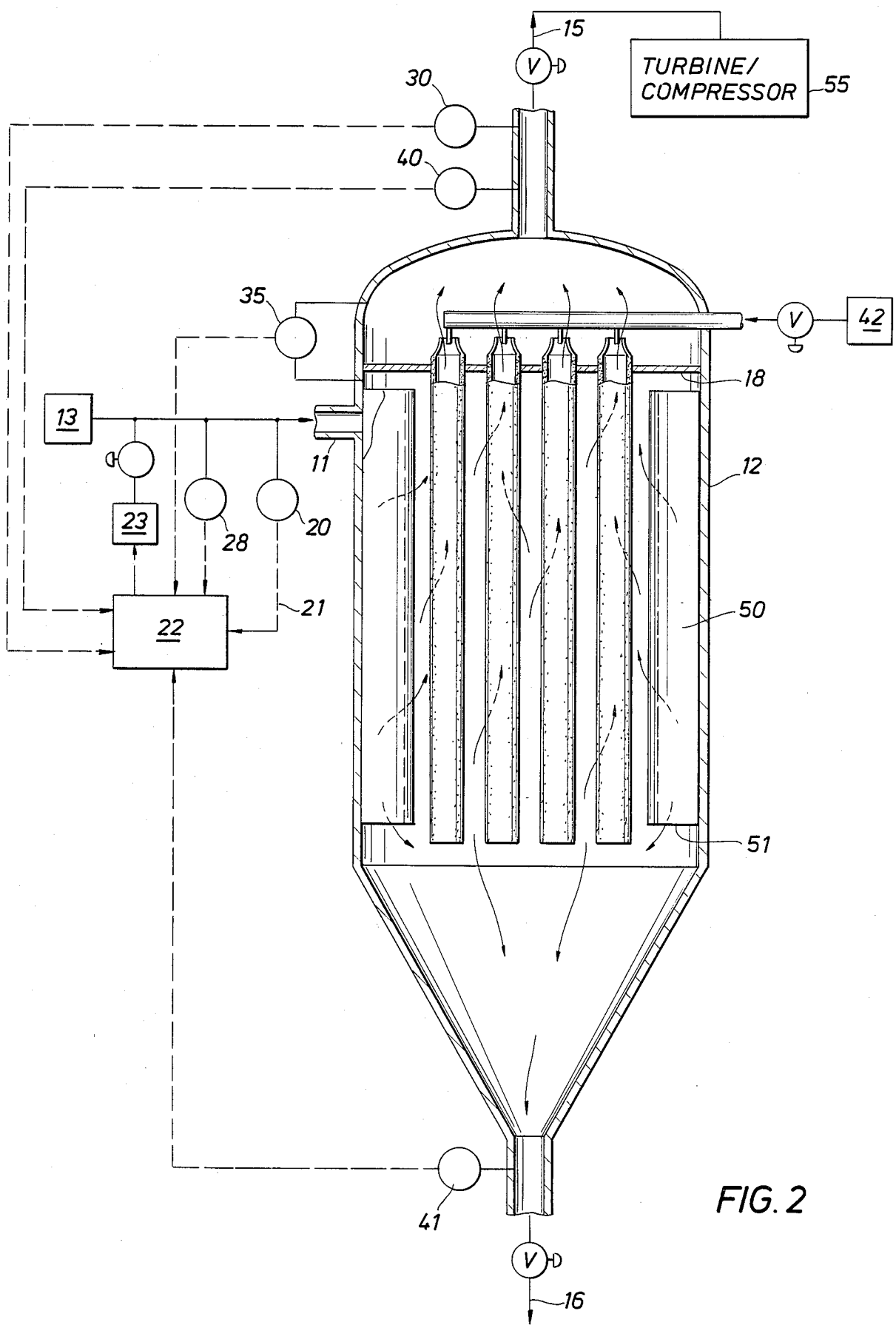
FIG. 2 illustrates another preferred embodiment of the invention.

FIG. 2 represents an embodiment of the present invention whereby the mixture is introduced in a direction which is tangential with respect to the container 12 in an annular region 50 formed by a baffle 51 contained within the container 12 as shown.

FIG. 3 represents an embodiment of the present invention whereby the mixture is introduced to container 12 via perforated pipe 52 in a radial direction with respect to the container 12.

Although the system for separating particulates from gas is shown in FIG. 1 in its distributed form as discrete components, it would be readily understood by those skilled in the art that these components could be combined into a single unit or otherwise implemented as may be most convenient for the particular application at hand. Furthermore, although the preferred embodiment has been shown as using an electronic process control system, it is also understood by those skilled in the art that the present invention could be effected using manual controls.

The foregoing description of the invention is merely intended to be explanatory thereof, and various changes in the details of the described method and apparatus may be made within the scope of the appended claims without departing from the spirit of the invention.

What is claimed is:

1. A method for separating fine particulates from a mixture of particulates and gas under elevated temperature and pressure conditions, said method comprising:

introducing the mixture of particulates and gas into a container, said introducing includes injecting said mixture in a direction tangential with respect to said container;

passing the mixture through filtering means located within said container thereby separating said particulates from said gases into two flowing streams, a first stream being mostly particulates and a second stream being mostly gas;

splitting the flow of the first and second streams to achieve a desired ratio of flow rates of said first and second streams;

deflecting said mixture within said container away from the upper portion thereof;

deflecting said mixture within said container towards the upper portion thereof;

determining a temperature of said mixture, comparing the determined temperature with a preselected temperature, and adjusting the temperature of said mixture by injecting a gas having a selected temperature into said mixture;

determining a particulate concentration of said second stream, comparing the determined particulate concentration with a preselected concentration, and adjusting the concentration of said second stream by adjusting the ratio of flow rates of said first and second streams;

determining a differential pressure across said filtering means;

comparing the determined differential pressure with a preselected differential pressure, dislodging particulates from said filtering means by injecting a gas into said container at a flow rate and pressure higher than said mixture introduced into said container, discontinuing injecting said gas into said container, and removing the dislodged particulates from said container;

recycling said second stream to a power recovering means;

determining a flow rate of said second stream, comparing said flow rate with a preselected flow rate, and adjusting the ratio of said first and second stream;

determining a flow rate of said first stream, comparing said flow rate with a preselected flow rate, and adjusting the ratio of said first and second streams;

determining a flow rate of said mixture, comparing said flow rate with a preselected flow rate, and adjusting the ratio of said first and second streams; and discharging said first and second streams separately from said container.

2. A method for separating fine particulates from a mixture of particulates and gas under elevated temperature and pressure conditions, said method comprising:

introducing the mixture of particulates and gas into a container, and introducing includes injecting said mixture in a radial direction with respect to said container;

passing the mixture through filtering means located within said container thereby separating said particulates from said gases into two flowing streams, a first stream being mostly particulates and a second stream being mostly gas;

splitting the flow of the first and second streams to achieve a desired ratio of flow rates of said first and second streams;

deflecting said mixture within said container away from the upper portion thereof;

deflecting said mixture within said container towards the upper portion thereof;

determining a temperature of said mixture, comparing the determined temperature with a preselected temperature, and adjusting the temperature of said mixture by injecting a gas having a selected temperature less than the determined temperature of said mixture into said mixture;

determining a particulate concentration of said second stream, comparing the determined particulate concentration with a preselected concentration, and adjusting the concentration of said second stream by adjusting the ratio of flow rates of said first and second streams;

determining a differential pressure across said filtering means;

comparing the determined differential pressure with a preselected differential pressure, dislodging particulates from said filtering means by injecting a gas into said container at a flow rate and pressure higher than said mixture introduced into said container, discontinuing injecting said gas into said container, and removing the dislodged particulates from said container;

recycling said second stream to a power recovering means;

determining a flow rate of said second stream, comparing said flow rate with a preselected flow rate, and adjusting the ratio of said first and second stream;

determining a flow rate of said first stream, comparing said flow rate with a preselected flow rate, and adjusting the ratio of said first and second streams;

determining a flow rate of said mixture, comparing said flow rate with a preselected flow rate, and adjusting the ratio of said first and second streams; and discharging said first and second streams separately from said container.

3. A method for separating fine particulates from a mixture of particulates and gas under elevated temperature and pressure conditions, said method comprising:

introducing the mixture of particulates and gas into a container, said introducing includes injecting said mixture in a direction tangential with respect to said container;

passing the mixture through filtering means located within said container thereby separating said particulates from said gases into two flowing streams, a first stream being mostly particulates and a second stream being mostly gas;

splitting the flow of the first and second streams to achieve a desired ratio of flow rates of said first and second streams;

deflecting said mixture within said container away from the upper portion thereof;

deflecting said mixture within said container towards the upper portion thereof;

determining a temperature of said mixture, comparing the determined temperature with a preselected temperature, and adjusting the temperature of said mixture by adjusting the ratio of flow rates between said first and second streams;

determining a particulate concentration of said second stream, comparing said determined particulate concentration with a preselected concentration, and adjusting the concentration of said second stream by adjusting the ratio of flow rates of said first and second streams;

determining a differential pressure across said filtering means;

comparing the determined differential pressure with a preselected differential pressure, dislodging particulates from said filtering means by injecting a gas into said container at a flow rate and pressure higher than said mixture introduced into said container, discontinuing injecting said gas into said container, and removing the dislodged particulates from said container;

recycling said second stream to a power recovering means;

determining a flow rate of said second stream, comparing said flow rate with a preselected flow rate, and adjusting the ratio of said first and second streams;

determining a flow rate of said first stream, comparing said flow rate with a preselected flow rate, and adjusting the ratio of said first and second streams;

determining a flow rate of said mixture, comparing said flow rate with a preselected flow rate, and adjusting the ratio of siad first and second streams; and discharging said first and second streams separately from said container.

4. A method for separating fine particulates from a mixture of particulates and gas under elevated temperature and pressure conditions, said method comprising:

introducing the mixture of particulates and gas into a container, said introducing includes injecting said mixture in a radial direction with resepct to said container;

passing the mixture through filtering menas located within said container thereby separating said particulates from said gases into two flowing streams, a first stream being mostly particulates and a second stream being mostly gas;

splitting the flow of the first and second streams to achieve a desired ratio of flow rates of said first and second streams;

deflecting said mixture within said container away from the upper portion thereof;

deflecting said mixture within said container towards the upper portion thereof;

determining a temperature of said mixture, comparing the determined temperature with a preselected temperature, and adjusting the temperature of said mixture by adjusting the ratio of flow rates between said first and second streams;

determining a particulate concentration of said second stream, comparing the determined particulate concentration with a preselected concentration, and adjusting the concentration of said second stream by adjusting the ratio of flow rates of said first and second streams;

determining a differential pressure across said filtering means;

comparing the determined differential pressure with a preselected differential pressure, dislodging particulates from said filtering means by injecting a gas into said container at a flow rate and pressure higher than said mixture introduced into said container, discontinuing injecting said gas into said container, and removing the dislodged particulates from said container;

recycling said second stream to a power recovering means;

determining a flow rate of said second stream, comparing said flow rate with a preselected flow rate, and adjusting the ratio of said first and second stream;

determining a flow rate of said first stream, comparing said flow rate with a preselected flow rate, and adjusting the ratio of said first and second streams;

determining a flow rate of said mixture, comparing said flow rate with a preselected flow rate, and adjusting the ratio of said first and second streams; and discharging said first and second streams separately from said container.

5. A method for separating fine particulates from a mixture of particulates and gas under elevated temperature and pressure conditions, said method comprising:

introducing the mixture of particulates and gas into a container;

passing said mixture through filtering means located within said container thereby separating said particulates from said gases into two flowing streams, a first stream being mostly particulates and a second stream being mostly gas;

splitting the flow of the first and second streams to achieve a desired ratio of flow rates of said first and second streams;

discharging said first and second streams separately from said container;

determining a temperature of said mixture;

comparing the determined temperature with a preselected temperature; and adjusting the temperature of said mixture wherein said adjusting the temperature includes injecting a gas having a selected temperature less than the determined temperature of said mixture into said mixture.

6. An apparatus for separating fine particulates from a mixture of particulates and gas under elevated temperature and pressure conditions, said apparatus comprising:

means for introducing the mixture of particulates and gas into a container, said means for introducing includes means for injecting said mixture in a direction tangential with respect to said container;

means for passing the mixture through filtering means located within said container thereby separating said particulates from said gases into two flowing streams, a first stream being mostly particulates and a second stream being mostly gas;

means for splitting the flow of the first and second streams to achieve a desired ratio of flow rates of said first and second streams;

means for deflecting said mixture within said container away from the upper portion thereof;

means for deflecting said mixture within said container towards the upper portion thereof;

means for determining a temperature of said mixture, means for comparing the determined temperature with a preselected temperature, and means for adjusting the temperature of said mixture including means for injecting a gas having a selected temperature less than the determined temperature of said mixture into said mixture;

means for determining a particulate concentration of said second stream, means for comparing the determined particulate concentration with a preselected concentration, and means for adjusting the concentration of said second stream including means for adjusting the ratio of flow rates of said first and second streams;

means for determining a differential pressure across said filtering means;

means for comparing the determined differential pressure with a preselected differential pressure, means for dislodging particulates from said filtering means including means for injecting a gas into said container at a flow rate and pressure higher than said mixture introduced into said container, means for discontinuing injecting said gas into said container, and means for removing the dislodged particulates from said container;

means for recycling said second stream to a power recovering means;

means for determining a flow rate of said second stream, means for comparing said flow rate with a preselected flow rate, and means for adjusting the ratio of said first and second streams;

means for determining a flow rate of said first stream, means for comparing said flow rate with a preselected flow rate, and means for adjusting the ratio of said first and second streams;

means for determining a flow rate of said mixture, means for comparing said flow rate with a preselected flow rate, and means for adjusting the ratio of said first and second streams; and means for discharging said first and second streams separately from said container.

7. An apparatus for separating fine particulates from a mixture of particulates and gas under elevated temperature and pressure conditions, said apparatus comprising:

means for introducing the mixture of particulates and gas into a container, said means for introducing includes means for injecting said mixture in a radial direction with respect to said container;

means for passing the mixture through filtering means located within said container thereby separating said particulates from said gases into two flowing streams, a first stream being mostly particulates and a second stream being mostly gas;

means for splitting the flow of the first and second streams to achieve a desired ratio of flow rates of said first and second streams;

means for deflecting said mixture within said container away from the upper portion thereof;

means for deflecting said mixture within said container towards the upper portion thereof;

means for determining a temperature of said mixture, means for comparing the determined temperature with a preselected temperature, and means for adjusting the temperature of said mixture including means for injecting a gas having a selected temperature into said mixture;

means for determining a particulate concentration of said second stream, means for comparing said determined particulate concentration with a preselected concentration, and means for adjusting the concentration of said second stream including means for adjusting the ratio of flow rates of said first and second streams;

means for determining a differential pressure across said filtering means;

means for comparing the determined differential pressure with a preselected differential pressure, means for dislodging particulates from said filtering means including means for injecting a gas into said container at a flow rate and pressure higher than said mixture introduced into said container, means for discontinuing injecting gas into said container, and means for removing the dislodged particulates from said container;

means for recycling said second stream to a power recovering means;

means for determining a flow rate of said second stream, means for comparing said flow rate with a preselected flow rate, and means for adjusting the ratio of said first and second streams;

means for determining a flow rate of said first stream, means for comparing said flow rate with a preselected flow rate, and means for adjusting the ratio of said first and second streams;

means for determining a flow rate of said mixture, means for comparing said flow rate with a preselected flow rate, and means for adjusting the ratio of said first and second streams; and means for discharging said first and second streams separately from said container.

8. An apparatus for separating fine particulates from a mixture of particulates and gas under elevated temperature and pressure conditions, said apparatus comprising:

means for introducing the mixture of particulates and gas into a container, said means for introducing includes means for injecting said mixture in a direction tangential with respect to said container;

means for passing the mixture through filtering means located within said container thereby separating said particulates from said gases into two flowing streams, a first stream being mostly particulates and a second stream being mostly gas;

means for splitting the flow of the first and second streams to achieve a desired ratio of flow rates of said first and second streams;

mean for deflecting said mixture within said container away from the upper portion thereof;

means for deflecting said mixture within said container towards the upper portion thereof;

means for determining a temperature of said mixture, means for comparing the determined temperature with a preselected temperature, and means for adjusting the temperature of said mixture including means for adjusting the ratio of flow rates between said first and second streams;

means for determining a particulate concentration of said second stream, means for comparing the determined particulate concentration with a preselected concentration, and means for adjusting the concentration of said second stream including means for adjusting the ratio of flow rates of said first and second streams;

means for determining a differential pressure across said filtering means;

means for comparing the determined differential pressure with a preselected differential pressure, means for dislodging particulates from said filtering means including means for injecting a gas into said container at a flow rate and pressure higher than said mixture introduced into said container, means for discontinuing injecting gas into said container, and means for removing the dislodged particulates from said container;

means for recycling said second stream to a power recovering means;

means for determining a flow rate of said second stream, means for comparing said flow rate with a preselected flow rate, and means for adjusting the ratio of said first and second streams;

means for determining a flow rate of said first stream, means for comparing said flow rate with a preselected flow rate, and means for adjusting the ratio of said first and second streams;

means for determining a flow rate of said mixture, means for comparing said flow rate with a preselected flow rate, and means for adjusting the ratio of said first and second streams; and means for discharging said first and second streams separately from said container.

9. An apparatus for separating fine particulates from a mixture of particulates and gas under elevated temperature and pressure conditions, said apparatus comprising:

means for introducing the mixture of particulates and gas into a container, said means for introducing includes injecting said mixture in a radial direction with respect to said container;

means for passing the mixture through filtering means located within said container thereby separating said particulates from said gases into two flowing streams, a first stream being mostly particulates and a second stream being mostly gas;

means for splitting the flow of the first and second streams to achieve a desired ratio of flow rate of said first and second streams;

means for deflecting said mixture within said container away from the upper portion thereof;

means for deflecting said mixture within said container towards the upper portion therof;

means for determining a temperature of said mixture, means for comparing the determined temperature with a preselected temperature, and means for adjusting the temperature of said mixture including means for adjusting the ratio of flow rates between said first and second streams;

means for determining a particulate concentration of said second stream, means for comparing the determined particulate concentration with a preselected concentration, and means for adjusting the concentration of said second stream including means for adjusting the ratio of flow rates of said first and second streams;

means for determining a differential pressure across said filtering means;

means for comparing the determined differential pressure with a preselected differential pressure, means for dislodging particulates from said filtering means by injecting a gas into said container at a flow rate and pressure higher than said mixture introduced into said container, means for discontinuing injecting said gas into container, and means for removing the dislodged particulates from said container;

means for recycling said second stream to a power recovering means;

means for determining a flow rate of said second stream, means for comparing said flow rate with a preselected flow rate, and means for adjusting the ratio of said first and second streams;

means for determining a flow rate of said first stream, means for comparing said flow rate with a preselected flow rate, and means for adjusting the ratio of said first and second streams;

means for determining a flow rate of said mixture, means for comparing said flow rate with a preselected flow rate, and means for adjusting the ratio of said first and second streams; and means for discharging said first and second streams separately from said container.

10. An apparatus for separating fine particulates from a mixture of particulates and gas under elevated temperature and pressure conditions, said apparatus comprising:

means for introducing the mixture of particulates and gas into a container;

means for passing said mixture through filtering means located within said container thereby separating said particules from said gases into two flowing streams, a first stream being mostly particules and a second stream being mostly gas;

means for splitting the flow of the first and second streams to achieve a desired ratio of flow rates of said first and second streams;

means for discharging said first and second streams separately from said container;

means for determining a temperature of said mixture;

means for comparing the determined temperature with a preselected temperature; and means for adjusting the temperature of said mixture wherein said means for adjusting said temperature includes means for injecting a gas having a selected temperature less than the determined temperature of said mixture into said mixture.

* * * * *